US012321795B1

(12) United States Patent
Stead et al.

(10) Patent No.: US 12,321,795 B1
(45) Date of Patent: Jun. 3, 2025

(54) SYSTEM AND METHOD FOR CENTRALIZED MANAGEMENT OF INDEPENDENT PLATFORMS

(71) Applicant: SENTRY INSURANCE COMPANY, Stevens Point, WI (US)

(72) Inventors: James Arthur Stead, Stevens Point, WI (US); Jason Christopher Bunn, Stevens Point, WI (US)

(73) Assignee: SENTRY INSURANCE COMPANY, Stevens Point, WI (US)

( * ) Notice: Subject to any disclaimer, the term of this patent is extended or adjusted under 35 U.S.C. 154(b) by 270 days.

(21) Appl. No.: 17/381,799

(22) Filed: Jul. 21, 2021

(51) Int. Cl.
  *G06F 9/54* (2006.01)
  *G06F 9/451* (2018.01)
  *G06F 9/48* (2006.01)

(52) U.S. Cl.
  CPC .............. *G06F 9/541* (2013.01); *G06F 9/451* (2018.02); *G06F 9/4881* (2013.01)

(58) Field of Classification Search
  None
  See application file for complete search history.

(56) References Cited

U.S. PATENT DOCUMENTS

| 7,685,273 B1 * | 3/2010 | Anastas | H04L 12/6418 |
| | | | 709/224 |
| 10,642,459 B2 * | 5/2020 | Sarbin | G06F 3/0488 |
| 2006/0190579 A1 * | 8/2006 | Rachniowski | H04L 41/0866 |
| | | | 709/223 |
| 2012/0072997 A1 * | 3/2012 | Carlson | G06Q 30/0254 |
| | | | 726/28 |
| 2013/0212484 A1 * | 8/2013 | Joshi | H04L 67/04 |
| | | | 715/740 |
| 2015/0066572 A1 * | 3/2015 | McLaren | G06Q 10/06316 |
| | | | 705/7.26 |
| 2015/0245204 A1 * | 8/2015 | Heydon | G06F 21/44 |
| | | | 713/171 |
| 2017/0300403 A1 * | 10/2017 | Ramraz | G06F 11/3414 |
| 2018/0101390 A1 * | 4/2018 | Warner | G06F 3/04817 |
| 2019/0007412 A1 * | 1/2019 | Ram | H04L 63/0876 |
| 2019/0310879 A1 * | 10/2019 | Singleton, IV | H04L 67/10 |
| 2020/0012548 A1 * | 1/2020 | Escutia Garcia | G06F 11/3409 |
| 2021/0027305 A1 * | 1/2021 | Mackie | G06Q 30/016 |

* cited by examiner

*Primary Examiner* — Chat C Do
*Assistant Examiner* — William C Wood
(74) *Attorney, Agent, or Firm* — Foley & Lardner LLP

(57) ABSTRACT

A computing device configured to manage one or more computing devices of an enterprise is disclosed. The computing device includes a transceiver, a memory, and a processor. The memory may include instructions stored thereon, that when executed by the processor, cause the processor to provide a user interface comprising one or more data objects, receive a command via the user interface, validate the command, prepare a script based on the command, the script comprising computer-readable instructions configured to be executed by one or more remote servers, schedule the script to be executed by the one or more remote servers, and receive a result from the one or more remote servers. The script is configured to implement the command on the one or more remote servers in order to facilitate the management of the processing system of the enterprise.

19 Claims, 4 Drawing Sheets

SYSTEM AND METHOD FOR CENTRALIZED MANAGEMENT OF INDEPENDENT PLATFORMS

TECHNICAL FIELD

The present disclosure relates, in general, to integrating independent platforms. More particularly, the present disclosure relates to facilitating communication between independent platforms.

BACKGROUND

The following description is provided to assist the understanding of the reader. None of the information provided or references cited is admitted to be prior art. Many companies and organizations have multiple independent systems that are used to provide a service to customers. In some cases, companies and organizations merge or acquire other existing companies or organizations that have one or more independent platforms. However, the independent systems may need to be updated or otherwise managed. Thus, maintaining the independent systems can be complex and difficult.

SUMMARY

An illustrative system includes a first computing device and a second computing device. The first computing device includes a processor coupled to a memory device. The memory device having computer-readable instructions stored thereon, that when executed by the processor, cause the first computing device to provide a user interface comprising one or more data objects, receive a command via the user interface, prepare a script based on the command, the script comprising computer-readable instructions, transmit the script to the second computing device, receive a result from the second computing device. The second computing device includes a processor configured to receive the script from the first computing device, create a job on the second computing device, the job configured to execute the script, execute the script, the script configured to implement the command on the second computing device, and establish an application programming interface (API) with the first computing device in order to provide a result of the script to the first computing device.

An illustrative computing device is configured to manage one or more computing devices of an enterprise. The computing device includes a transceiver, a memory, and a processor. The memory may include instructions stored thereon, that when executed by the processor, cause the processor to provide a user interface comprising one or more data objects, receive a command via the user interface, prepare a script based on the command, the script comprising computer-readable instructions configured to be executed by one or more remote servers, transmit the script to the one or more remote servers, and receive a result from the one or more remote servers. The script is configured to implement the command on the one or more remote servers in order to facilitate the management of the processing system of the enterprise.

An illustrative computing-implemented method includes providing, by a first computing device to a second computing device, a user interface configured to receive one or more commands, receiving, by the first computing device from the second computing device, a command via the user interface, preparing, by the first computing device, a script based on the command, the script comprising computer-readable instructions configured to implement the command, transmitting, by the first computing device via an application programming interface (API), the script to a third computing device, receiving, by the first computing device, a result upon execution of the script by the third computing device, and providing, by the first computing device, a notification configured to notify an administrator of the result.

The foregoing summary is illustrative only and is not intended to be in any way limiting. In addition to the illustrative aspects, embodiments, and features described above, further aspects, embodiments, and features will become apparent by reference to the following drawings and the detailed description.

Figure 1:
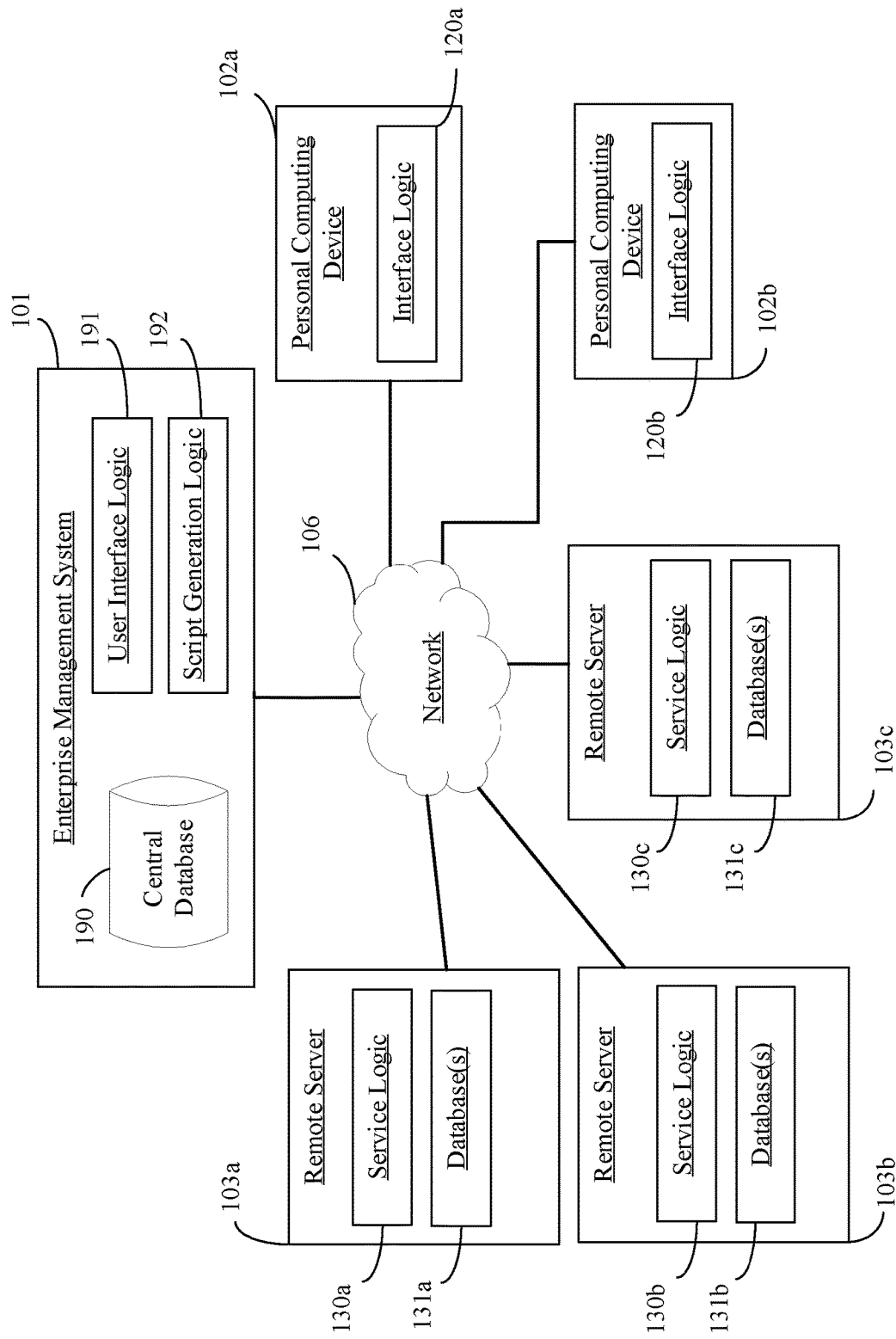
FIG. 1 is a block diagram of a processing system in accordance with an illustrative embodiment.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Many organizations have multiple computer networks or systems that work in concert to provide a service to customers. Oftentimes, organizations automate or computerize multiple specific tasks using a discrete program or computer system for each task. For example, as computers and computer programs become more advanced, organizations are automating more advanced tasks. Over time, an organization can accumulate multiple individual systems that each execute respective computer applications in order to provide one or more services to their customers.

In many instances, the individual systems were each originally designed to perform a particular function in order to provide a particular service to customers. Accordingly, the individual systems may each include data stored locally that was collected, for example, as part of providing the particular service. Moreover, an organization or company may acquire or merge with other organizations or companies that have particular data stored for the existing customers at independent platforms. These independent platforms may be located behind various firewalls, security zones, and/or otherwise geographically separated from one another. Additionally, the independent platforms may each include local databases that store information according to a respective schema. As such, management of the independent platforms and respective databases by administrators of the enterprise may be difficult or cumbersome. For example, an administrator may have to travel to the location of the remote server to update or manage the various independent platforms. In another example, the administrators may have to generate codes unique to each remote server depending upon the respective schema of how data is stored in each respective database on the remote servers.

Thus, effectively managing the independent platforms can become increasingly difficult for enterprises. The systems and methods disclosed herein provide a central computing system of the enterprise with the ability to facilitate the management of the independent platforms via a user interface (e.g., a web interface). For example, the user interface allows for an administrator or other entity with management rights (e.g., an application programmer of the enterprise) to facilitate the requesting and management of database requests across a variety of servers (e.g., independent platforms) and databases in order to maintain the databases.

As a brief exemplary summary, the enterprise management system (e.g., central computing system) may provide a user interface to a computing device in response to an administrator navigating to a respective web portal and entering in respective credentials. In some embodiments, the user interface includes a listing of servers (e.g., remote servers or independent platforms) and respective databases. The enterprise management system receives inputs (e.g., commands) from the administrator via the user interface that indicate to the enterprise management system to perform an action. The enterprise management system may groom and prepare the user inputs into a script (e.g., a powershell or transact-SQL script) to perform the action. In some embodiments, the action may include running a script (e.g., a transact-SQL script), backups/restores of particular databases, deploying files (e.g., XMLA files), creating permissions, and/or deploying schema changes to a particular database. The enterprise management system may then create a job (e.g., a server agent job) on each remote server (e.g., independent platform) in the request. The job may then be executed at each remote server and the enterprise management system may receive a notification upon completion at each of the remote servers. In some embodiments, the job to execute the request may be scheduled via a third party software scheduler at the request of the enterprise management system. The notification may include details such as results, outputs, and runtimes of the job. In some embodiments, the enterprise management system updates the user interface based on the notification and/or transmits a confirmation message to the administrator (e.g., to a mobile device or email). In various embodiments, the user interface may depict the runtime results both after completion (e.g., full execution of the job) or while the job is running or being executing.

In this way, the enterprise management system is able to manage the requests from an administrator in a controlled and efficient manner that enables the management of the independent platforms. In particular, the enterprise management system as disclosed herein allows for the integration of the computing systems of the enterprise via automation of the management process. For example, the user interface enables the enterprise management system to receive user inputs (e.g., a command or request) via one or more templates that the enterprise management system is then able to automatically, validate the command and/or user inputs, generate the code (e.g., scripts) necessary to enact the changes requested by the administrator (e.g., user), and schedule the code to be executed by respective remote servers. Accordingly, the user interface and enterprise management system improves the efficiency, reliability, and convenience of managing the independent platforms (e.g., independent database systems) and thereby all of the computing systems of the enterprise. Additionally, the user interface and the enterprise management system enhance security of all the computing systems of the enterprise since any changes are made via known and trusted computer accounts and improves the stability of the computing environment due to the validation steps that are performed as part of the methods and systems described herein.

FIG. 1 is a block diagram of a processing system in accordance with an illustrative embodiment. An illustrative processing system 100 includes an enterprise management system 101 (e.g., a central system) and one or more remote server systems 103a-c (e.g., independent platforms). In alternative embodiments, additional, fewer, and/or different elements may be used. For example, various embodiments and examples described herein relate to an insurance company. However, the disclosure is not meant to be limited to insurance companies but can be easily adapted for use in any suitable system.

The various elements illustrated in FIG. 1 can communicate with one another using any suitable communication protocol. For example, some elements may communicate using a unique communication protocol over a network 106. Communication between the elements can be wired or wireless. The communication can be via one or more networks, such as a local area network (LAN), a wide area network (WAN), direct communications, the Internet, etc.

The processing system 100 can be used to provide services to customers. That is, the remote servers 103a-c may include service logic 130a-c and one or more databases 131a-c. The service logic 130a-c includes logic, that when executed by one or more processors, allows for the respective remote sever 103a-c to provide one or more services to customers. For example, in the context of an insurance company, the processing system 100 can be used to provide services related to insurance products. An illustrative first remote server system 103a may include a health insurance policy management system that manages health insurance policies and/or quotes for insurance policies. For example, the first remote server system 103a can facilitate initiating a new policy, qualify potential policy holders, provide quotes, issue policies, maintain policies (e.g., report premiums, perform audits, etc.), facilitate changes to policies, renew policies, etc. As another example, a second remote server system 103b may include a life insurance policy management system. In yet another example, a third remote server system 103c may include a life insurance policy management system acquired by the organization from a third-party organization. The databases 131a-c may include information relating to services provided to the customers such as policy information, premium information, customer information, and so on. Although in these examples the remote servers are explained as relating to managing insurance policies, the remote servers can be any suitable computing device for any other industry, sector, purpose, etc.

The enterprise management system 101 is a central management platform for the enterprise. The enterprise management system 101 is communicably coupled to the remote servers 103a-c and the personal computing devices 102a-b via the network 106. In various embodiments, the enterprise management system 101 includes a central database 190, user interface logic 191, and script generation logic 191. The central database 190 may serve as a central repository to store metadata regarding the remote servers 103a-c. Moreover, the central database 190 may include a list of the remote servers 103a-c associated with the enterprise as well as respective network locations and metadata thereof. For example, the central database 190 may store information regarding a number of databases of each remote server 103a-c, a history of the databases of each remote server 103a-c, a history of scripts that have been generated by the enterprise management system 101, and/or a history of scripts that have been executed by each remote server 103a-c. Additionally or alternatively, the central database 190 may store a list of API protocols for the respective remote servers 103a-c that enable communication between the enterprise management system 101 and the remote servers 103a-c.

Figure 3:
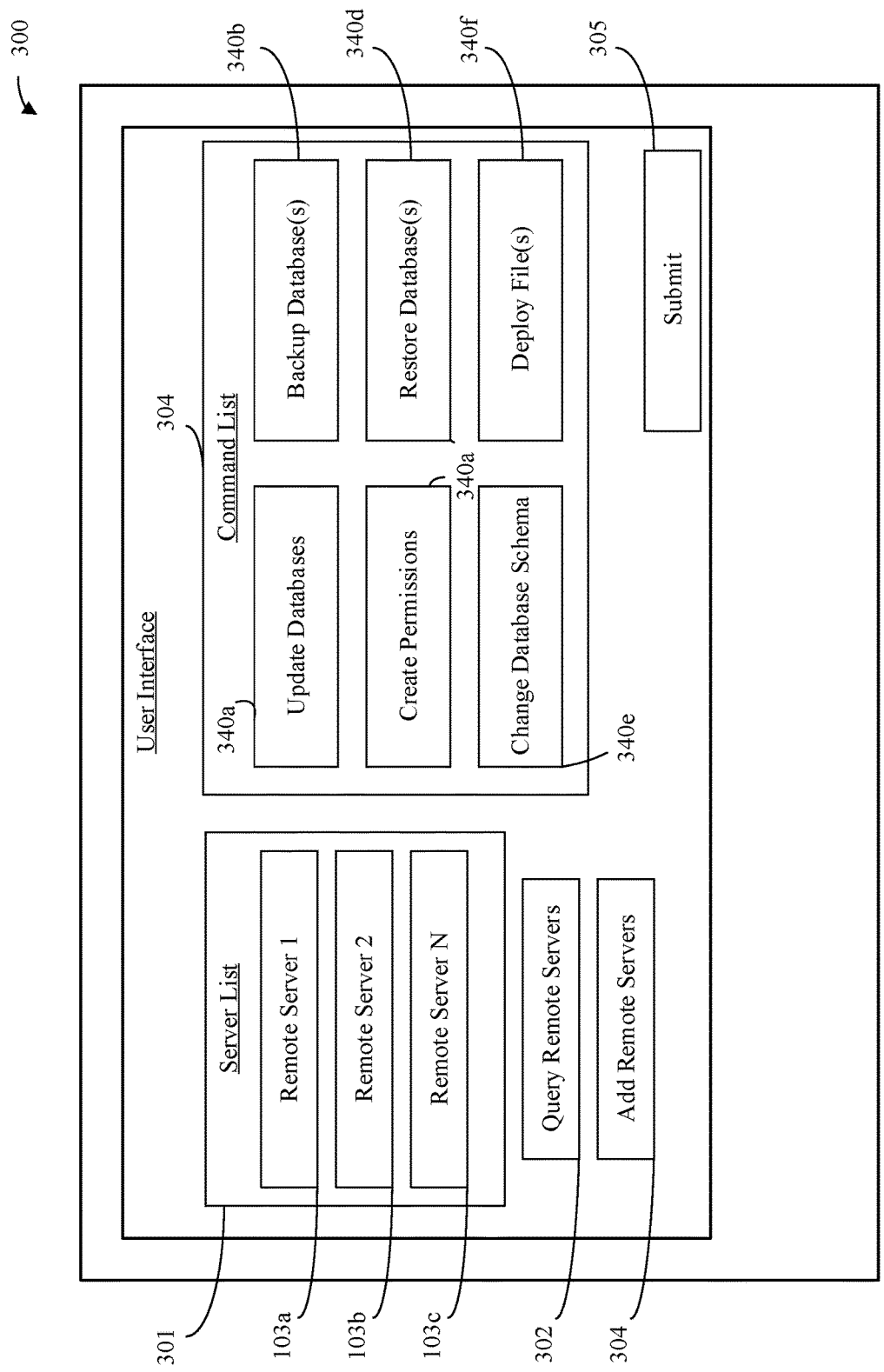
FIG. 3 is an example user interface for managing independent platforms in accordance with an illustrative embodiment.

The user interface logic 191 includes instructions that, when executed by one or more processors of the enterprise management system 101, is configured to generate one or more user interfaces such as the user interface discussed in reference to FIG. 3. The user interface logic 191 may be configured to generate and provide a login page to one or more of the various personal computing devices 102a-b that access the enterprise management system 101 via, for example, a web portal or application. Additionally or alternatively, the user interface logic 191 may generate and provide a user interface that allows for a user (e.g., administrator of the enterprise) to enter in one or more commands in order to manage the remote servers 103a-c. For example, the user interface logic 191 may generate, provide, and/or store one or more interface templates that, when accessed, allow for the administrator to add or upload data and provide a command to the enterprise management system 101 to implement a change to one or more of the remote servers 103a-c.

The script generation logic 192 includes instructions that, when executed by one or more of the processors of the enterprise management system 101, is configured to generate a script (e.g., computer-readable instructions) based on the command received via the user interface. For example, the command may include a selection indicating that the administrator would like to backup a database from a first and second of the remote servers 103a and 103b to the central database. The script generation logic 192 is configured to generate the code necessary to implement the command. In some embodiments, the script generation logic 192 may groom or parse the inputs of the command, determine or access code or scripts relevant to the inputs, and prepare the script by compiling the code or scripts relevant to the inputs and including and inputted data. For example, the script generation logic 192 may be configured to access or generate a series of pre-defined scripts (e.g., powershell scripts) that take inputs (e.g., the user inputs) from the user interface and convert them into computer executable commands that may be executed on the remote servers.

The personal computing devices 102a-b are devices that may be used to access the remote servers 103a-b and/or the enterprise management system 101 via the network 106. For example, the personal computing devices 102a-b may include desktop computers, laptops, tablets, mobile devices such as smartphones, and so on. The personal computing devices 102a-b may include an application unique the enterprise management system 101 downloaded and/or stored thereon. As one example, the personal computing devices 102a-b may include interface logic 120a-b. The interface logic 120a-b is configured to allow navigation to a portal or webpage associated with the enterprise management system 101 via the application or a browser, display the user interfaces of the enterprise management system 101, receive various inputs from an administrator via the user interfaces, and transmit the various inputs to the enterprise management system 101.

Figure 2:
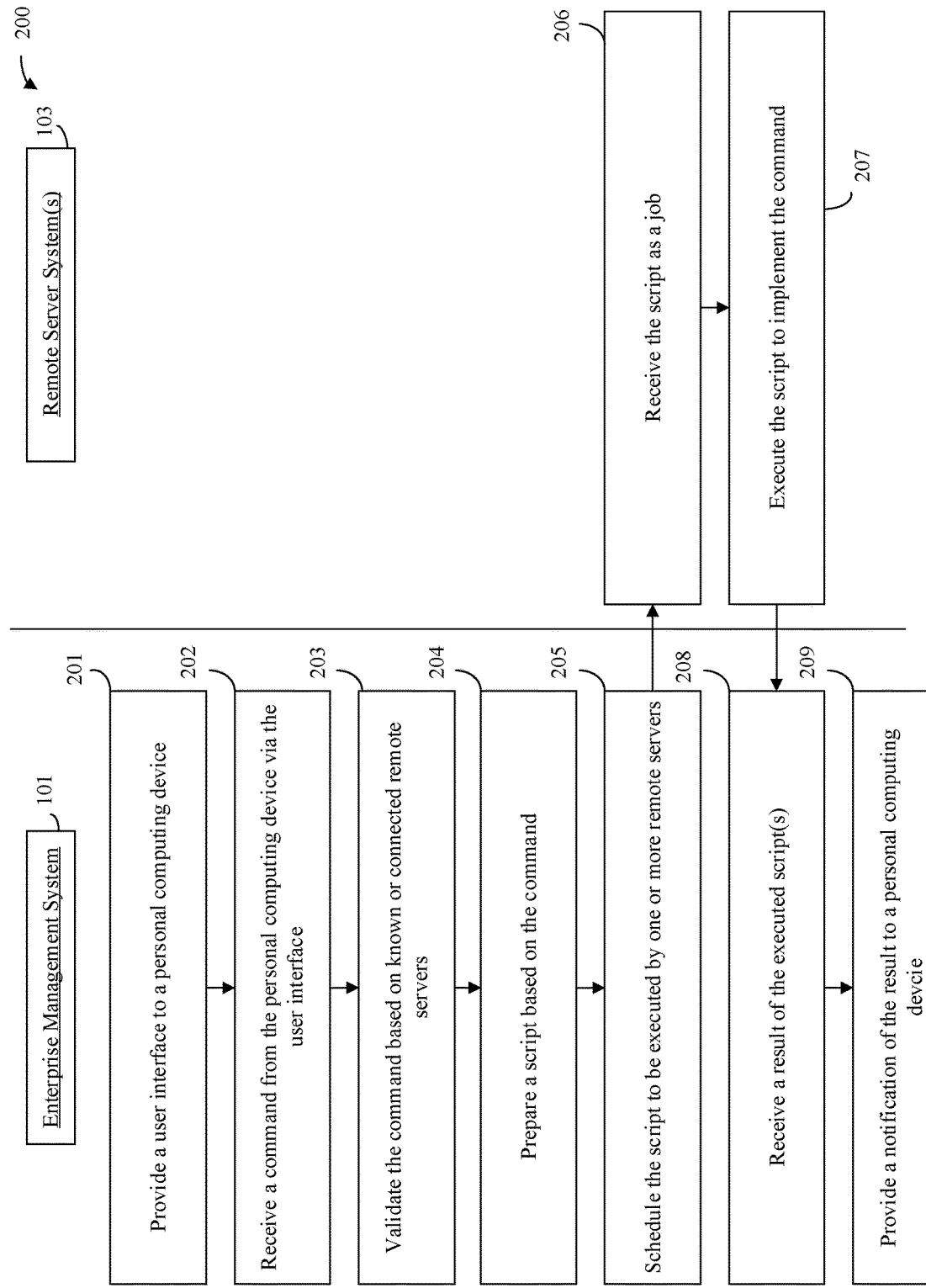
FIG. 2 is a flow diagram of a method for managing independent platforms in accordance with an illustrative embodiment.

FIG. 2 is a flow diagram of a method 200 for integrating platforms via the enterprise management system in accordance with an illustrative embodiment. In alternative embodiments, additional, fewer, and/or different operations may be performed. Also, the use of a flow diagram and arrows is not meant to be limiting with respect to the order or flow of operations. For example, one or more operations may be performed simultaneously. The operations described throughout FIG. 2 may be performed by the respective computing systems, for example, a processor executing machine-readable instructions stored on memory of one or more respective computing devices such as the computing device described in reference to FIG. 4. For example, each device or system may have respective scripts or code written in various languages such as PowerShell scripting language, SQL server's query language (TSQL), C sharp (C#), Visual Basic (e.g., VB.net), and so on that cause the operations described herein.

In some embodiments, the method 200 generally includes the enterprise management system 101 creating scripts in a particular manner based on one or more commands received via a user interface that enables the enterprise management system 101 to manage the computing systems across the processing system 100.

In an operation 201, the enterprise management system 101 provides a user interface to a personal computing device 102a or 102b. For example, an administrator may access a portal or web interface via a browser or application on the personal computing device 102a. In response to detecting that the personal computing device 102a is attempting to access the portal or web interface, the enterprise management system 102a may provide a login page to the personal computing device 102a. The administrator may then enter credentials (e.g., username, password, biometric information etc.) to the personal computing device 102a that is transmitted to the enterprise management system 101 to authenticate the administrator. Alternatively or additionally, the enterprise management system 101 may authenticate the user via an active directory automatically when a user or administrator logs into the network/computing environment. In response to authenticating the administrator, the enterprise management system 101 may then provide a user interface similar to the user interface as described in reference to FIG. 3. The user interface allows for the administrator, via the personal computing device 102a to enter in one or more commands that allow for the administrator to enact changes or otherwise manage the remote server systems 103a-c in the processing system 100.

In an operation 202, the enterprise management system 101 receives a command from the personal computing device 102a via the user interface. For example, the administrator may interact with enterprise management system 101 via the user interface by providing one or more commands. The commands may include a command to backup or restore one or more databases within the processing system 100, push or deploy files to one or more remote servers 103a-c, update databases within the processing system 100 (e.g., add or remove columns or rows), deploy or enact database schema changes, and so on. In various embodiments, the user interface includes a list of the remote servers 103a-c and/or respective databases that are connected to the enterprise management system 101. The user interface may allow for the administrator to select one or more of the remote servers 103a-c or databases from the list in order to view the current condition thereof. In some embodiments, the user interface may include one or more templates, where each respective template is unique to a particular command. In some embodiments, the user interface may allow for the administrator to create a template for a new command. The template may then be stored at the enterprise management system 101 and accessible via the interface in the future. In some embodiments, the template allows for the administrator to select one or more remote servers 103a-c that the command is to be implemented on, enter data (e.g., an XML file, or data field) that is to be implemented as part of the command, and submit icon. Upon selection of the submit icon, the enterprise management system 101 may receive the command and the associated data.

In an operation 203, the enterprise management system 101 validates the command based on known or connected remote servers 103a-c. For example, the enterprise management system 101 may determine one or more remote servers 103a-c that the command is to be implemented on, determine whether changes within the command are relevant to particular remote server systems 103a-c, and/or determine whether the relevant remote servers 103a-c are online (e.g., connected to the enterprise management system 101 via the network 106). In some embodiments, the enterprise management system 101 may validate the command by determining, from the user inputs associated with the command, one or more remote server systems 103a-c that are the target of the command and ensuring that the changes requested by the user inputs can indeed be implemented on the targeted one or more remote server systems 103a-c. For example, the enterprise management system 101 may parse the user inputs to check the validity of the information such as a server name, database identifier, and so on. In some embodiments, the enterprise management system 101 may validate the command by checking permissions of the user to see if the type of changes requested are allowed to be implemented via the user. Alternatively or additionally, the enterprise management system 101 may validate the command by first implementing or executing a script as a test, the results of the test may then be displayed on the user interface such that the user can see the data that will be affected (e.g., metadata such as number or rows columns affected) and the user can manually validate the command via the user interface. If the command is validated, the script may be executed thereby causing the changes to be implemented in the database. In various embodiments, if the enterprise management system 101 cannot validate the command, the enterprise management system 101 may cause a notification of the error to the administrator either via the user interface or via transmitting the notification via an email or text message to a personal computing device associated with the administrator.

In an operation 204, the enterprise management system 101 prepares a script based on the command. For example, the enterprise management system 101 generates a script (e.g., computer-readable or executable code, etc.) that allows for the enterprise management system 101 to implement the command at one or more of the remote servers 103a-c. In one example, the enterprise management system 101 may map particular data fields from the template or user interface into preset, scripted actions (e.g., code blocks) such that the script can be executed by the one or more remote servers 103a-c in order to implement the command. For example, templates may be created by the user or administrator to facilitate repeated requests in a more streamlined, efficient manner. In another example, the data entered into the user interface and received as part of the command is groomed before prepared into the script. In some embodiments, the script may be a powershell, TSQL, or other type of script. In some embodiments, the enterprise management system 101 may require a lookup action. For example, the enterprise management system 101 may look into one or more databases on the remote servers 103a-c that are to execute the script (e.g., target databases) and generate the script such that the desired action from the administrator is implemented when the remote servers 103a-c run the script. In some embodiments, the script may back up or restore one or more particular databases based on the specific inputs from the user. Accordingly, in some embodiments, the enterprise management system 101 may generate a script that is unique to each of the remote server system 103a-c that are to implement the command.

In an operation 205, the enterprise management system 101 schedules the script to be executed by one or more of the remote server systems 103a-c. For example, the enterprise management system 101 may determine which remote server systems 103a-c are to execute the script based on the command. In some embodiments, the enterprise management system may run code (e.g., SQL code) to create a job on the remote server that will executed at a time requested by the user. In some embodiments, the command includes a selection of the remote server systems 103a-c that are to receive the script (e.g., selected on the user interface by the administrator). Alternatively or additionally, the enterprise management system 101 may automatically determine which of the remote servers 103a-c that are to receive the script based on the type of command. For example, some commands may be unique to particular remote server systems 103a-b. The enterprise management system 101 may then push or transmit the script across the network 106 to the respective remote server systems 103a-b. In some embodiments, the enterprise management system 101 may transmit the script to the respective remote server systems 103a-b via respective application programming interface (API) protocols. In some embodiments, the enterprise management system 101 may create a server agent job (e.g., SQL server agent job) including the script and transmit the job to the remote server systems 103a-c. In some embodiments, the scripts may be packaged and/or encrypted before transmission. In some embodiments, the script may be configured to run on user demand that causes the script to be executed immediately after the user releases the command from the user interface of the enterprise management system 101.

In an operation 206, the one or more remote server systems 103a-c receives the script and sets the script as a job to be executed. In some embodiments, the job including the script is executed immediately upon receipt. In some embodiments, the job may be queued and executed at a pre-determined time. In this way, the remote server systems 103a-c may execute jobs during particular hours (e.g., 2a.m.-5a.m.) that minimizes any undesired downtimes.

In an operation 207, the one or more remote server systems 103a-c execute the script thereby implementing the command. In various embodiments, the one or more remote server systems 103*a-c* notifies the enterprise management system 101 of when the job will be executed or when the job has begun execution. In some embodiments, the one or more remote server systems 103*a-c* may delete the script upon successfully executing the job. Alternatively or additionally, the one or more remote server systems 103*a-c* may store the script within a history file upon completion of the job. In some embodiments, one or more remote server systems 103*a-c* may create a backup of any databases that are being changed in the script. In this way, if the job or script contains an error, the respective remote server system 103*a* is able to restore the previous database in order to prevent undesired downtimes.

In an operation 208, the enterprise management system 101 receives a result of the executed script. The result may include a result outcome (e.g., success or failure), an output (e.g., the new data created as a result of the script execution), and/or the runtime of the script. In some embodiments, one or more remote server systems 103*a-c* transmits the result to the enterprise management system 101 via an API. In one example, the one or more remote server systems 103*a-c* may transmit the results to the enterprise management system 101 via a SOAP API (e.g., or similar API) such that the enterprise management system 101 receives the results of the script execution during execution and after execution. In this way, the enterprise management system 101 may provide the results of the script execution during the execution of the script to the administrator via the user interface.

In an operation 209, the enterprise management system 101 provides a notification of the result to a personal computing device 102*a* or 102*b*. For example, the enterprise management system 101 may provide a text message (e.g., SMS message), email, and/or push notification to a personal computing device 102*b* associated with the administrator upon completion of the job (e.g., execution of the script). In various embodiments, the enterprise management system 101 may provide notifications to alert the administrator at various points of the process. For example, a notification may be sent of when the job has been queued, started, and/or completed. In this way, the administrator may access the user interface to monitor and/or see the outcomes or results of the job and script thereby ensuring that the remote server systems 103*a-c* are being properly managed. In some embodiments, the enterprise management system 101 may store the script and/or results such that the script can be accessed and manually downloaded or sent as a job in the future.

FIG. 3 depicts an example of a user interface 300 for managing one or more remote servers in accordance with an illustrative embodiment. For example, the user interface 300 may be displayed on a personal computing device 102*a-b* upon successful authentication.

The user interface 300 includes a server list 301, a query icon 302, an add server icon 303, a command list 304, and a submit icon 305. The server list 301 includes a listing of the remote servers 103*a-c* of the enterprise. In some embodiments, server list 301 may include a status indicator (e.g., active, idle, not connected, etc.) of the remote servers 103*a-c*. In this example, the enterprise management system 101 may ping each of the remote servers 103*a-c* periodically or upon providing the user interface in order to provide an updated status of the remote servers 103*a-c* on the user interface. In some embodiments, the query icon 302, when selected, may cause the enterprise management system 302 to ping the remote servers 103*a-c* and/or search the network 106 for additional remote servers of the enterprise. Moreover, the add server icon 303, when selected, may allow for the user to enter information regarding a newly added remote server to enterprise. For example, the user interface 300 may update and allow for an administrator to add network location information, credentials, and/or API information that allows for the enterprise management system 101 to identify and connect with the new remote server via the network. In such an embodiment, the new remote server may be added to the server list 301. In some embodiments, a new remote server may be added to a support database on the enterprise management system 101 and the enterprise management system 101 may add the new remote server to the server list 301 to be displayed. The submit icon 305, when selected, may cause the command and/or user inputs selected on the user interface 300 to be transmitted to the enterprise management system 101. In some embodiments, the user interface 300 may also include a timing section that allows for a user to select when the scripts will be run. For example, the timing section may include an immediate icon that causes the scripts to immediately be performed on the remote server, a schedule icon that allows for a user to schedule a particular time, a repeat daily icon that causes the script to be re-executed each day, and/or an outside of business hours icon that causes the script to be executed on the respective remote servers outside of business hours (e.g., 10 p.m.).

The command list 304 includes various commands 340*a-f* that may be selected by the administrator to manage the processing system 100. For example, the command list 304 may include an update database icon 340*a*, a backup database icon 340*b*, a create permissions icon 340*c*, a restore database icon 340*d*, a change database schema icon 340*e*, and/or a deploy files icon 340*f*. It is to be appreciated that the commands 340*a-f* listed in FIG. 3 are not intended to be an exclusive list and that in other embodiments additional or fewer commands may be implemented via the user interface 300. For example, the list of commands may include a script command that allows for a user to select a particular script to be executed, a restore command that allows for a user to restore a particular database, a backup command 340*b* that allows for a user to backup a particular database, a create database command that allows for a user to create one or more databases on a remote server, a permissions command that allows for a user to update permissions of particular users and their access to the databases, a data center migration command that allows for a user to migrate and/or merge databases, an add server command that allows for an address of a server to be added and the server to be added to the server list, a test command that allows for a user to test the resilience of a remote server and databases, and so on.

In an embodiment, each icon of the various commands 340*a-f* may cause the user interface 300 to update and display a respective template. For example, upon selecting the update database icon 340, the user interface 300 may update to display a template that prompts the user to select the databases of the enterprise that are to be updated, to upload a database or data that is to be included or removed as part of the update, and/or a pointer to the data that is to be included as part of the update. Upon selection of the submit icon 305, the personal computing device 102*a* packages the information from the template and transmits the command to the enterprise management system 101 in order to generate the necessary script (e.g., code) to update the selected databases as indicated. The script is then dispersed or provided to the relevant remote servers 103*a-c* to execute the script and update the databases. In this way, the user interface 300 may be used to effectively, reliably, and efficiently manage the various remote servers 103a-c and respective databases of an enterprise.

In some embodiments, the user interface 300 may include a first field that depicts and/or allows for the user to enter in a server instance, a second field that depicts and/or allows for the user to select a particular database to be changed, a third field that allows for a user to enter in a description of the script being executed for future reference, and/or an upload icon that allows for a user to manually select data implemented as part of the script. In this way, the user interface 300 may allow for the user to efficiently ensure that the correct servers and databases are being targeted, a robust record of the changes are being documented, and efficiently select the data and/or scripts that are part of the command.

Figure 4:
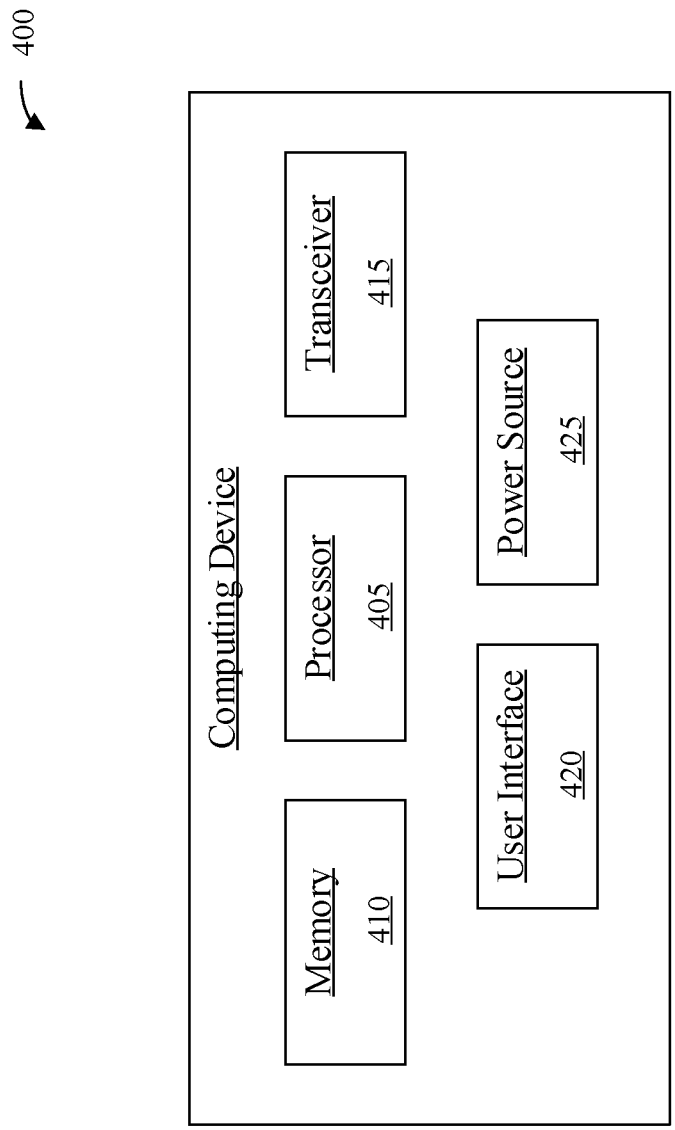
FIG. 4 is a block diagram of a computing device in accordance with an illustrative embodiment.

FIG. 4 is a block diagram of a computing device in accordance with an illustrative embodiment. An illustrative computing device 400 includes a memory 410, a processor 405, a transceiver 415, a user interface 420, and a power source 425. In alternative embodiments, additional, fewer, and/or different elements may be used. The computing device 400 can be any suitable device described herein. For example, the enterprise management system 101, the remote server systems 103a-c, and/or the personal computing devices 102a-b may each include one or more computing devices 400. The computing device 400 can be a desktop computer, a laptop computer, a smartphone, a server, a specialized computing device, etc. The computing device 400 can be used to implement one or more of the methods described herein.

In an illustrative embodiment, the memory 410 is an electronic holding place or storage for information so that the information can be accessed by the processor 305. The memory 410 can include, but is not limited to, any type of random access memory (RAM), any type of read only memory (ROM), any type of flash memory, etc. such as magnetic storage devices (e.g., hard disk, floppy disk, magnetic strips, etc.), optical disks (e.g., compact disk (CD), digital versatile disk (DVD), etc.), smart cards, flash memory devices, etc. The computing device 400 may have one or more computer-readable media that use the same or a different memory media technology. The computing device 400 may have one or more drives that support the loading of a memory medium such as a CD, a DVD, a flash memory card, etc. For example, the computer-readable media may include instructions thereon, that when executed, cause the one or more operations described in reference to FIGS. 1 and 2.

In an illustrative embodiment, the processor 405 executes instructions. The instructions may be carried out by a special purpose computer, logic circuits, or hardware circuits. The processor 405 may be implemented in hardware, firmware, software, or any combination thereof. The term "execution" is, for example, the process of running an application or the carrying out of the operation called for by an instruction. The instructions may be written using one or more programming language, scripting language, assembly language, etc. The processor 305 executes an instruction, meaning that it performs the operations called for by that instruction. The processor 405 operably couples with the user interface 420, the transceiver 415, the memory 410, etc. to receive, to send, and to process information and to control the operations of the computing device 400. The processor 405 may retrieve a set of instructions from a permanent memory device such as a ROM device and copy the instructions in an executable form to a temporary memory device that is generally some form of RAM. An illustrative computing device 400 may include a plurality of processors that use the same or a different processing technology. In an illustrative embodiment, the instructions may be stored in memory 410.

In an illustrative embodiment, the transceiver 415 is configured to receive and/or transmit information. In some embodiments, the transceiver 415 communicates information via a wired connection, such as an Ethernet connection, one or more twisted pair wires, coaxial cables, fiber optic cables, etc. In some embodiments, the transceiver 415 communicates information via a wireless connection using microwaves, infrared waves, radio waves, spread spectrum technologies, satellites, etc. The transceiver 415 can be configured to communicate with another device using cellular networks, local area networks, wide area networks, the Internet, etc. In some embodiments, one or more of the elements of the computing device 400 communicate via wired or wireless communications. In some embodiments, the transceiver 415 provides an interface for presenting information from the computing device 400 to external systems, users, or memory. For example, the transceiver 415 may include an interface to a display, a printer, a speaker, etc. In an illustrative embodiment, the transceiver 415 may also include alarm/indicator lights, a network interface, a disk drive, a computer memory device, etc. In an illustrative embodiment, the transceiver 415 can receive information from external systems, users, memory, etc.

In an illustrative embodiment, the user interface 420 is configured to receive and/or provide information from/to a user. The user interface 420 can be any suitable user interface. The user interface 420 can be an interface for receiving user input and/or machine instructions for entry into the computing device 400. The user interface 420 may use various input technologies including, but not limited to, a keyboard, a stylus and/or touch screen, a mouse, a track ball, a keypad, a microphone, voice recognition, motion recognition, disk drives, remote controllers, input ports, one or more buttons, dials, joysticks, touchscreen etc. to allow an external source, such as a user, to enter information into the computing device 400. The user interface 420 can be used to navigate menus, adjust options, adjust settings, adjust display, etc.

The user interface 420 can be configured to provide an interface for presenting information from the computing device 400 to external systems, users, memory, etc. For example, the user interface 420 can include an interface for a display, a printer, a speaker, alarm/indicator lights, a network interface, a disk drive, keyboard, mouse, a computer memory device, etc. The user interface 420 can include a color display, a cathode-ray tube (CRT), a liquid crystal display (LCD), a plasma display, an organic light-emitting diode (OLED) display, etc.

In an illustrative embodiment, the power source 425 is configured to provide electrical power to one or more elements of the computing device 400. In some embodiments, the power source 425 includes an alternating power source, such as available line voltage (e.g., 120 Volts alternating current at 60 Hertz in the United States). The power source 425 can include one or more transformers, rectifiers, etc. to convert electrical power into power useable by the one or more elements of the computing device 400, such as 1.5 Volts, 8 Volts, 12 Volts, 24 Volts, etc. The power source 425 can include one or more batteries.

In an illustrative embodiment, any of the operations described herein can be implemented at least in part as computer-readable instructions stored on a computer-readable memory. Upon execution of the computer-readable instructions by a processor, the computer-readable instructions can cause a computing device to perform the operations.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A first computing device configured to manage a plurality of second computing devices of an enterprise, the first computing device comprising:
   a transceiver configured to communicably couple the first computing device to a network;
   a memory having application data relating to one or more customers stored thereon; and
   a processor operatively coupled to the memory and the transceiver, the processor configured to:
   provide a user interface comprising one or more data objects, each of the data objects corresponding to one of the plurality of second computing devices;
   receive a command via the user interface, the command comprising one or more user inputs corresponding to at least one of the one or more data objects indicating a request to be implemented on the corresponding one or more of the plurality of second computing devices;
   validate the command based on stored information regarding the one or more of the plurality of second computing devices, wherein validating the command comprises assessing a database identifier to determine whether the command is relevant to contents of the one or more of the plurality of second computing devices based on a database identifier of the one or more of the plurality of second computing devices;
   display, on the user interface, a predicted response indicative of a predicted execution of the command;
   receive, via the user interface and responsive to the display of the predicted response, a confirmation of the command;
   prepare a script based on the command, the script comprising computer-readable instructions configured to be executed by the one or more of the plurality of second computing devices, wherein, to prepare the script, the processor is further configured to identify a type of the command, and generate the computer-readable instructions based on the type of the command and the user inputs;

schedule, responsive to the receipt of the confirmation of the command, the script to be executed by one or more of the plurality of second computing devices, the schedule deferring execution of the script until a predefined time, or upon an expiration of a predefined timer; and receive a result of the script from the one or more of the plurality of second computing devices.

2. The first computing device of claim 1, wherein:
the plurality of second computing devices each host a respective database; and
the validation of the command comprises validation of the database identifier for each of the respective databases.

3. The first computing device of claim 1, wherein to prepare the script, the processor is configured to implement the user inputs into pre-defined code stored on the memory.

4. The first computing device of claim 3, wherein to prepare the script, the processor is configured to groom the user inputs based on the type of the command.

5. The first computing device of claim 1, the processor further configured to establish an application programming interface (API) with the one or more of the plurality of second computing devices, and provide the result to a second user interface while the script is being executed by the one or more of the plurality of second computing devices.

6. The first computing device of claim 1, wherein to schedule the script, the processor is configured to create server job agents for the script on the one or more of the plurality of second computing devices.

7. The first computing device of claim 1, the processor further configured to authenticate login credentials provided via a login page before the processor provides the user interface.

8. The first computing device of claim 1, wherein the result includes a runtime and an output of the script.

9. The first computing device of claim 1, wherein the request requests:
to back up a database;
to restore a database; or
to change a schema of a database.

10. A system comprising:
a first computing device comprising:
a first transceiver configured to communicably couple the first computing device to a network;
a first memory; and
a first processor operatively coupled to the first memory and the first transceiver, the first processor configured to:
provide a user interface comprising one or more data objects, each of the data objects corresponding to one of a plurality of second computing devices;
receive a command via the user interface, the command including one or more user inputs corresponding to at least of the one or more data objects;
validate the command based on the one or more user inputs, wherein validating the command comprises assessing a database identifier to determine whether the command is relevant to contents of one or more of the plurality of second computing devices based on a database identifier of the one or more of the plurality of second computing devices;

display, on the user interface, a predicted response indicative of a predicted execution of the command;
receive, via the user interface and responsive to the display of the predicted response, a confirmation of the command;
prepare a script based on the command, the script comprising computer-readable instructions, wherein, to prepare the script, the first processor is further configured to identify a type of the command, and generate the computer-readable instructions based on the type of the command and the user inputs;
transmit the script to a second computing device of the plurality of second computing devices; and
receive a result from the second computing device; and
the one or more of the second computing devices comprising:
a second transceiver configured to communicably couple the second computing device to the network;
a second memory having application data relating to one or more customers stored thereon; and
a second processor operatively coupled to the second memory and the second transceiver, the second processor configured to:
receive the script from the first computing device;
create a job on the second computing device, the job configured to execute the script;
execute the script to implement the command on the one or more of the second computing devices based on the receipt of the confirmation of the command; and
establish an application programming interface (API) with the first computing device in order to provide the result of the script to the first computing device.

11. The system of claim 10, the first processor further configured to authenticate login credentials of a user provided via a login page before the provision of the user interface.

12. The system of claim 11, the first processor further configured to provide a notification of the result to a third computing device associated with the user.

13. The system of claim 10, wherein the request requests:
to backup a database of the one or more of the second computing devices;
to restore a database of the one or more of the second computing devices; or
to change a schema of a database of the one or more of the second computing devices.

14. The system of claim 10, wherein the user interface is provided via a web-based portal to a third computing device.

15. The system of claim 10, wherein the user interface comprises one or more templates, each template unique to a particular command, and wherein the script is prepared based on the one or more templates.

16. The system of claim 10, wherein the first processor is further configured to store the script and the result within a history file of a central database.

17. A computer-implemented method comprising:
providing, by a first computing device to a plurality of second computing devices, a user interface configured to receive one or more commands;
receiving, by the first computing device from the plurality of second computing devices, a command via the user interface, the command including one or more user inputs and an indication of a target computing device;

validating, by the first computing device, the command based on the user inputs, a database identifier, and contents of the target computing device;

presenting, by the first computing device on the user interface, a predicted response indicative of a predicted execution of the command;

receiving, by the first computing device via the user interface, a confirmation of the command;

preparing, by the first computing device, a script based on the command, the script comprising computer-readable instructions configured to implement the command, wherein, to prepare the script, the first computing device is further configured to identify a type of the command, and generate the computer-readable instructions based on the type of the command and the user inputs;

scheduling, by the first computing device via an application programming interface (API), the script to be executed by the target computing device, the scheduling to defer execution of the script;

receiving, by the first computing device, a result upon execution of the script by the target computing device; and providing, by the first computing device, a notification configured to notify an administrator of the result.

18. The method of claim 17, wherein the command is based on a template provided to the plurality of second computing devices via the user interface.

19. The method of claim 18, wherein the script is stored within a database of the first computing device and accessible via the user interface.

* * * * *